US012651849B2

(12) United States Patent
Liu et al.

(10) Patent No.: US 12,651,849 B2
(45) Date of Patent: Jun. 9, 2026

(54) MODULES FOR CELLULAR BASE STATIONS AND BRACKET ASSEMBLIES FOR MOUNTING SAME

(71) Applicant: Outdoor Wireless Networks LLC, Claremont, NC (US)

(72) Inventors: Maosheng Liu, Suzhou (CN); Martin Zimmerman, Chicago, IL (US)

(73) Assignee: Outdoor Wireless Networks LLC, Richardson, TX (US)

( * ) Notice: Subject to any disclaimer, the term of this patent is extended or adjusted under 35 U.S.C. 154(b) by 140 days.

(21) Appl. No.: 18/554,685

(22) PCT Filed: Apr. 6, 2022

(86) PCT No.: PCT/US2022/023610
§ 371 (c)(1),
(2) Date: Oct. 10, 2023

(87) PCT Pub. No.: WO2022/221110
PCT Pub. Date: Oct. 20, 2022

(65) Prior Publication Data

US 2025/0079723 A1 Mar. 6, 2025

Related U.S. Application Data

(60) Provisional application No. 63/175,205, filed on Apr. 15, 2021.

(51) Int. Cl.
*H01Q 21/20* (2006.01)
*H01Q 1/02* (2006.01)
(Continued)

(52) U.S. Cl.
CPC ............. *H01Q 21/205* (2013.01); *H01Q 1/02* (2013.01); *H01Q 1/246* (2013.01); *H01Q 1/44* (2013.01)

(58) Field of Classification Search
CPC ............ H01Q 1/02; H01Q 1/246; H01Q 1/44; H01Q 21/205
See application file for complete search history.

(56) References Cited

U.S. PATENT DOCUMENTS

2014/0355525 A1* 12/2014 Barzegar ............... H04L 5/0003 370/329
2018/0227775 A1 8/2018 Bisiules et al.
(Continued)

FOREIGN PATENT DOCUMENTS

WO WO-2020060819 A1 * 3/2020 ............... H01Q 1/12
WO 2020072880 A1 4/2020
WO WO-2020223928 A1 * 11/2020 ............. H01Q 21/28

OTHER PUBLICATIONS

International Preliminary Report on Patentability corresponding to PCT/US2022/023610; Issued: Oct. 12, 2023, (7 pages).
(Continued)

*Primary Examiner* — Hoang V Nguyen
(74) *Attorney, Agent, or Firm* — Myers Bigel, P.A.

(57) ABSTRACT

An antenna-radio module for a cellular base station includes: an antenna having a cylindrical outer surface and a lower surface, wherein a plurality of antenna communications ports are present in the lower surface; and a plurality of radio sectors, each of the radio sectors having an outer surface and an upper surface, wherein at least one radio communications port is present on the upper surface. The plurality of radio sectors are arranged to form an annulus. Each of the radio communications ports is mated in a blind-mate configuration to a respective one of the antenna communications ports. The module further includes an elongate member inserted through the annulus, the radio sectors and the antenna being mounted to the elongate member.

20 Claims, 4 Drawing Sheets

(51) Int. Cl.
*H01Q 1/24* (2006.01)
*H01Q 1/44* (2006.01)

(56) References Cited

U.S. PATENT DOCUMENTS

| | | | | |
|---|---|---|---|---|
| 2018/0316086 | A1* | 11/2018 | Lehman ................. | H01Q 1/246 |
| 2019/0267700 | A1 | 8/2019 | Hendrix et al. | |
| 2021/0006019 | A1 | 1/2021 | Wankoff et al. | |

OTHER PUBLICATIONS

"International Search Report and Written Opinion corresponding to International Application No. PCT/US2022/023610 mailed Jul. 25, 2022".

* cited by examiner

MODULES FOR CELLULAR BASE STATIONS AND BRACKET ASSEMBLIES FOR MOUNTING SAME

RELATED APPLICATION

The present application is a 35 U.S.C. § 371 national phase application of PCT Application PCT/US2022/023610, filed Apr. 6, 2022, which claims priority from and the benefit of U.S. Provisional Patent Application No. 63/175,205, filed Apr. 15, 2021, the disclosure of which is hereby incorporated herein by reference in full.

FIELD OF THE INVENTION is directed generally toward cellular base stations, and more particularly to antennas and radios for cellular base stations.

BACKGROUND

As wireless data service demands have grown, a conventional response has been to increase the number and capacity of conventional cellular Base Stations (Macro-Cells). The antennas used by such Macro-Cells are typically mounted on antenna towers. A conventional antenna tower has three or four legs on which antennas and supporting remote radio units (RRUs) are mounted. However, in some environments structures known as "monopoles" are used as mounting structures. Monopoles are typically employed when fewer antennas/RRUs are to be mounted, and/or when a structure of less height is required.

Macro-Cell sites are becoming less available, and available spectrum limits how much additional capacity can be derived from a given Macro-Cell. Accordingly, small cell RRU and antenna combinations have been developed to "fill in" underserved or congested areas that would otherwise be within a Macro-Cell site. Deployment of small cells, particularly in urban environments, is expected to continue to grow. Often such small cell configurations (sometimes termed "Metrocells") are mounted on monopoles. In some instances, metrocells may be mounted on existing structures, such as buildings, billboards, kiosks, and the like. See, e.g., U.S. Patent Publication No. 2017/0324154 to Hendrix e al. and U.S. Provisional Patent Application No. 62/827,469, filed Jun. 27, 2019, each of which is hereby incorporated herein by reference in full. In addition, metrocells may be mounted on streetlight poles and the like. See, e.g., U.S. Provisional Patent Application No. 63/050,249, filed Jul. 10, 2020, the disclosure of which is hereby incorporated herein in full by references.

When metrocells are deployed in environments where aesthetic appearance is important (or even dictated by local regulation), the components of the metrocell (e.g., antennas and RRUs) may be concealed from view via external housings and the like. As such, designs have been developed to conceal these components. One exemplary design is shown in FIG. 1, in which an assembly 100 includes a luminaire arm 12 that supports a luminaire 14, an RRU module 15 and an antenna module 16. It can be seen that the RRU and antenna modules 15, 16 are largely concealed and do not extend radially outwardly from the exterior of the underlying pole 10. However, as the configurations and sizes of antennas and RRUs also vary between manufacturers and also change over time, techniques for concealing these components may also require new designs. Thus, it may be desirable to provide additional metrocell concealment arrangements.

SUMMARY

As a first aspect, embodiments of the invention are directed to an antenna-radio module for a cellular base station. The module comprises: an antenna having a cylindrical outer surface and a lower surface, wherein at least one antenna communications port is present in the lower surface; an annular radio having an outer surface and an upper surface, wherein at least one radio communications port is present on the upper surface, wherein the at least one radio communications port and the at least one antenna communications port are mated in a blind-mate configuration; and an elongate member, the radio and the antenna being mounted to the elongate member.

As a second aspect, embodiments of the invention are directed to an antenna-radio module for a cellular base station comprising: an antenna having a cylindrical outer surface and a lower surface, wherein a plurality of antenna communications ports are present in the lower surface; a plurality of radio sectors, each of the radio sectors having an outer surface and an upper surface, wherein at least one radio communications port is present on the upper surface, wherein the plurality of radio sectors are arranged to form an annulus; and wherein each of the radio communications ports is mated in a blind-mate configuration to a respective one of the antenna communications ports; and an elongate member inserted through the annulus, the radio sectors and the antenna being mounted to the elongate member.

DETAILED DESCRIPTION

Figure 1:
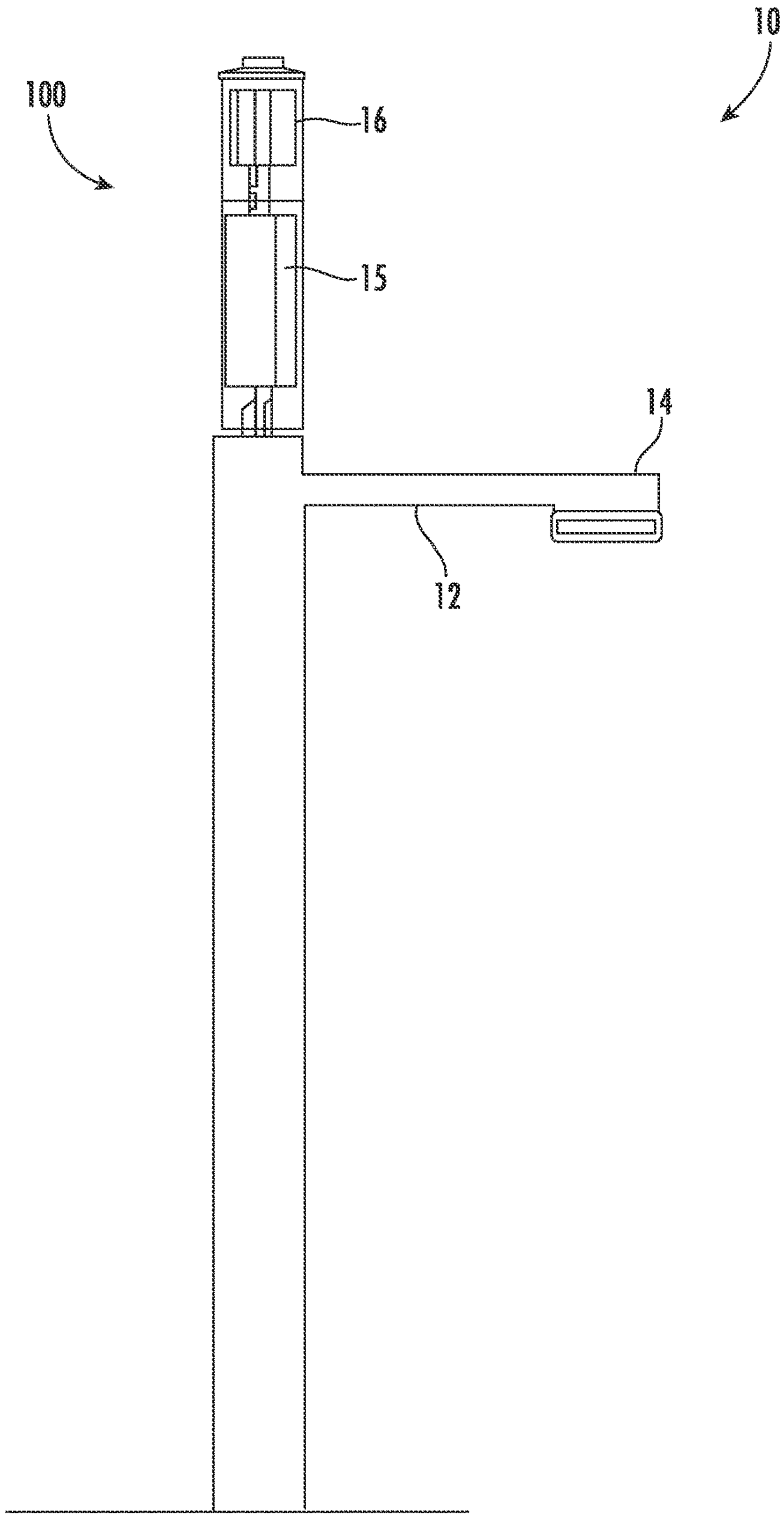
FIG. 1 is a front view of an exemplary monopole with a luminaire attached and an antenna module mounted thereon.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the figures, certain layers, components or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Figure 2:
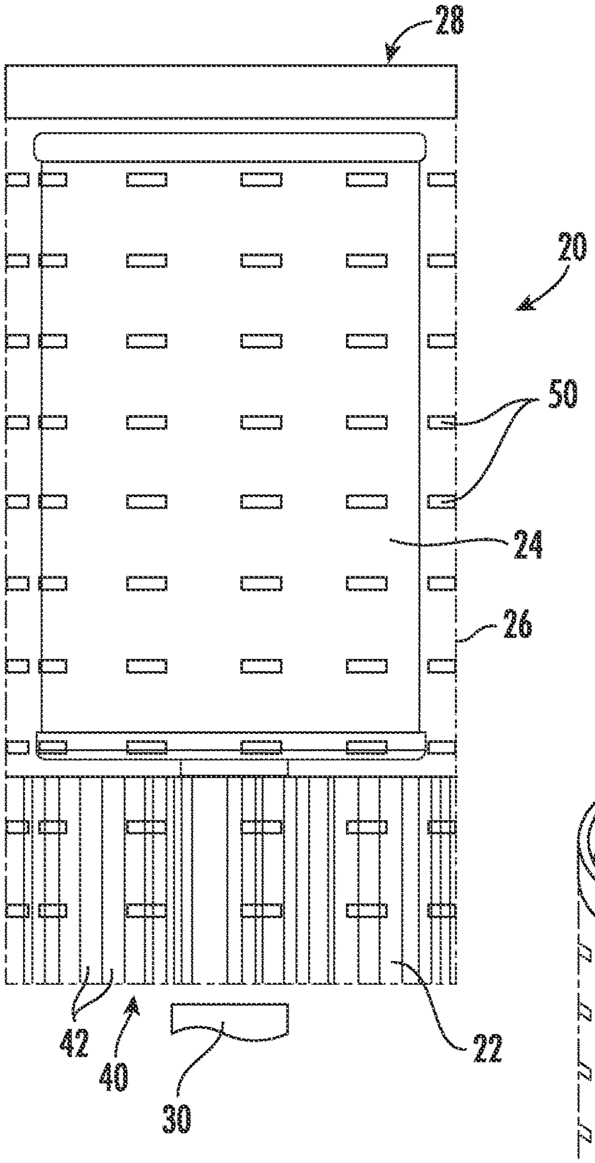
FIG. 2 is a side view of an antenna-radio module according to embodiments of the invention.
Figure 3:
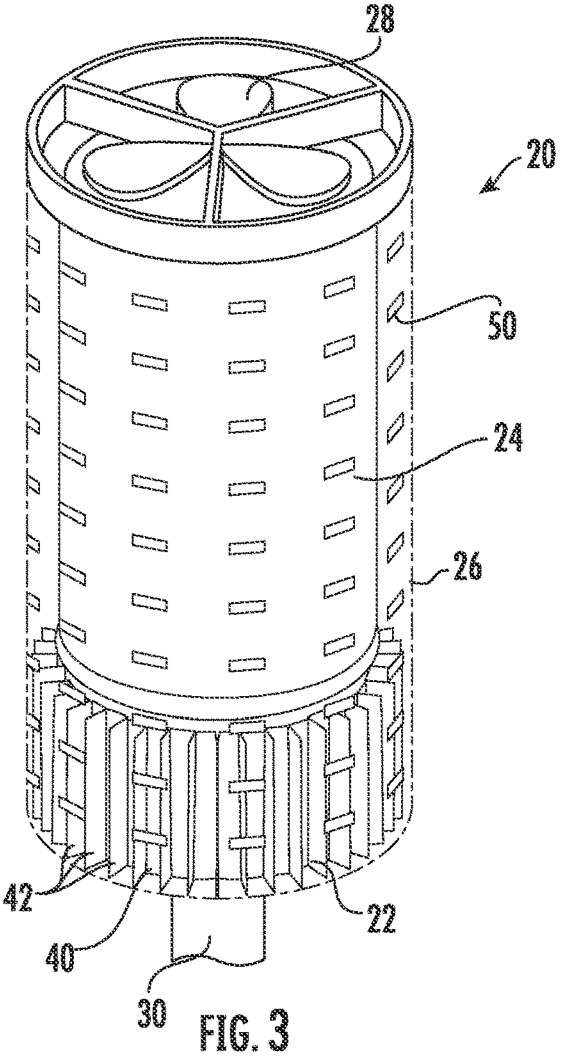
FIG. 3 is a top perspective view of the antenna-radio module of FIG. 2.
Figure 4:
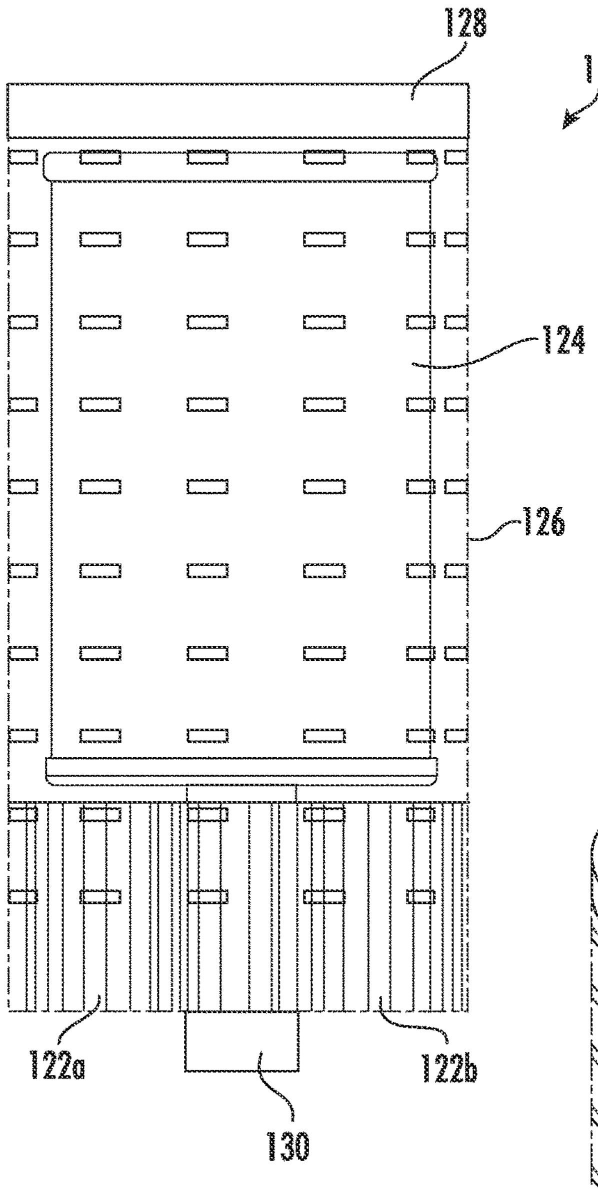
FIG. 4 is a side view of an antenna-radio module according to alternative embodiments of the invention.
Figure 5:
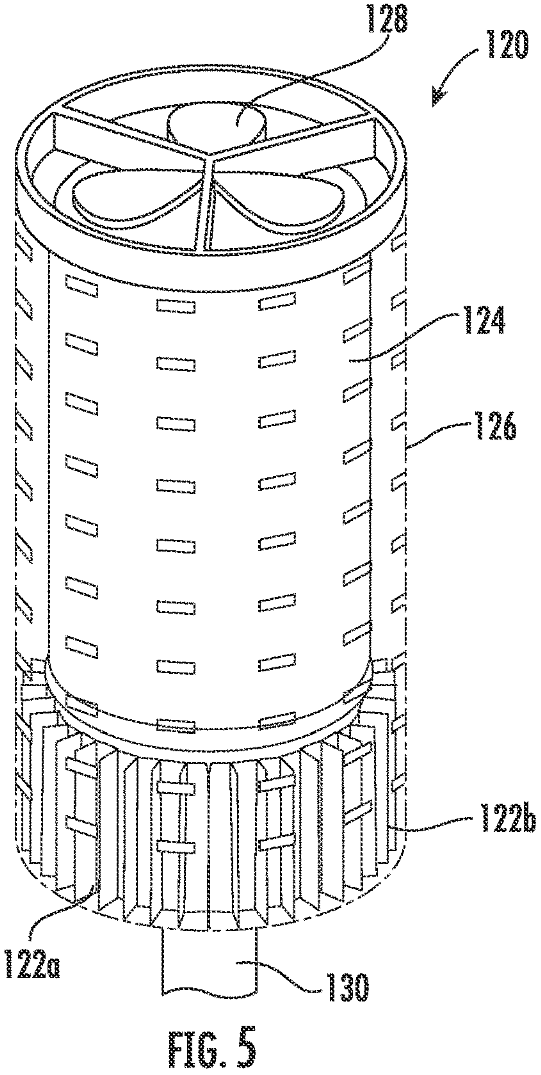
FIG. 5 is a top perspective view of the antenna-radio module of FIG. 4.

Referring now to the drawings, FIGS. 2 and 3 illustrate an antenna-radio module, designated broadly at 20, that is constructed according to embodiments of the invention. The module 20 includes a radio 22, an antenna 24, a shroud 26, and a fan unit 28, all of which are mounted on a pole 30 or other elongate member, which is in turn mounted to a monopole or other mounting structure. These components are described below.

As shown in FIGS. 2 and 3, the radio 22 is generally cylindrical, with a main body 40 that is mounted atop the pole 30. As shown in the figures, the radio 22 may have cooling fins 42 on its outer surface. The radio 22 may also include communications ports on the upper surface of the main body 40 (not shown herein) that can blind-mate with ports on the lower surface of the antenna 24. The radio 22 may be configured to operate within the protocols of any capability (4G, 5G, etc.) desired for the location.

The radio 22 may be mounted on the pole 30 in any manner known to be suitable for mounting such components (e.g., via specialized brackets or other hardware, an end cap, etc.). If an end cap is employed, it may include holes, slots or other apertures that permit the passage of cables from below the end cap to the radio 22. Different varieties of end caps and other mounting hardware are shown, for example, in U.S. Patent Publication No. 2020/0388907 to Colapietro, 2020/0388902 to Colapietro, and 2020/0106169 to Ahmed; the disclosures of these documents are hereby incorporated by reference herein in full.

Still referring to FIGS. 2 and 3, the antenna 24 is generally configured as a cylinder (sometimes known as a "canister" antenna) and is mounted atop the radio 22. The antenna 24 may include ports on its lower surface that can blind-mate with the ports on the radio 22 to provide communication between the radio 22 and the antenna 24.

The antenna 24 may be of any configuration known to be suitable for use in a small cell base station. Exemplary antennas include omnidirectional antennas.

The shroud 26 is generally cylindrical and is sized to cover and conceal the radio 22 and the antenna 24. The shroud 26 is typically formed of a material that enables the passage of signals to and from the antenna 24; exemplary materials for the shroud may include polymeric materials such as PVC, fiberglass, fiber-reinforced polypropylene, acrylonitrile styrene acrylate (ASA), polycarbonate, and the like.

The shroud 26 may include venting holes 50 that enable cooling air to pass through the module 20. The flow of such cooling air may be enhanced by the inclusion of the fan unit 28. In some embodiments, the shroud 26 may be formed as a unitary member, whereas in other embodiments the shroud 26 may be formed as separate components (e.g., one component covering the radio 22 and a second component covering the antenna 24, or in two semicylindrical halves).

In some embodiments, the pole 30 may be hollow. A hollow pole 30 may permit the routing of cables therein (for example, power cables may be routed to the fan unit 28, and/or signal cables may be routed from beneath to the radio 22). Additionally, a hollow pole 30 with holes therein may provide additional vents for cooling air.

The module 20 described above can provide a cellular base station that is aesthetically pleasing and that blends well with the pole on which it is mounted. Also, the blind-mating of the radio 22 and antenna 24 can prevent any signal loss that otherwise might occur due to excessive cable lengths between the radio and antenna.

Figure 6:
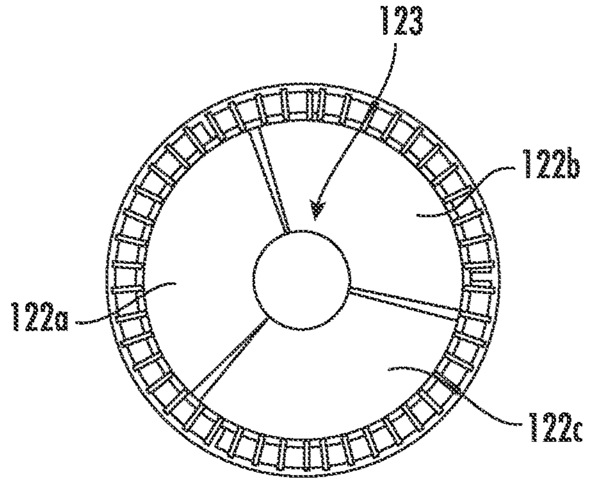
FIG. 6 is a bottom view of the antenna-radio module of FIG. 4.

Referring now to FIGS. 4-7, another antenna-radio module, designated broadly at 120, is shown therein. The module 120 is similar to the module 20 in that it includes an antenna 124, a shroud 126 and a fan unit 128 mounted on a pole 130. However, in this embodiment, three radio sectors **122*a*, 122*b*, 122*c* are included. The radio sectors 122*a*, 122*b*, 122*c* may combine to function as a single radio unit, or they may each function as a separate radio. As shown in FIG. 6, the radio sectors 122*a*, 122*b*, 122*c* can be mounted so that they form an annulus with an opening 123 that captures the pole 130. The radio sectors 122*a*, 122*b*, 122*c* include ports on their upper surfaces that can connect with ports on the lower surface of the antenna 124**.

The radio sectors **122*a-c* may be mounted on the pole 130 in any manner known to be suitable for mounting such components (e.g., via specialized brackets or other hardware). It may also be noted that mounting the radio sectors 122*a-c* in contact with or very near the pole 130 may permit the pole 130 to act as a heat sink for the radio sectors 122*a-c*, thereby reducing the degree of cooling provided by the fan unit 128 (or even eliminating entirely the need for the fan unit 128 and/or the cooling fins 142**).

Figure 7:
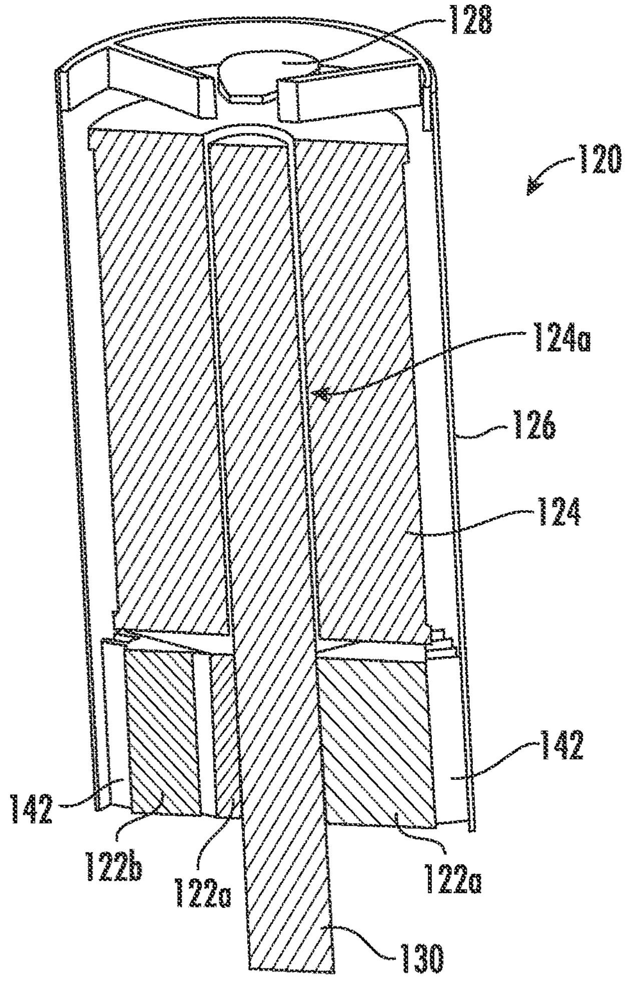
FIG. 7 is a perspective section view of the antenna-radio module of FIG. 4.

Also, in this embodiment, the antenna 124 is annular rather than cylindrical, such that the pole 130 can be inserted through the opening 124*a* in the antenna 124 (see FIG. 7). This may be a desirable arrangement when other components are to be mounted above the antenna 124 (e.g., a luminaire, as shown in U.S. Provisional patent application Ser. No. 17/189,467 to Rai, filed Mar. 2, 2021, and in U.S. Provisional Patent Application No. 63/149,462, filed Feb. 15, 2021 to Gienger, both of which are hereby incorporated herein by reference in full). The discussion above regarding venting and cooling of the module 20 is equally applicable here to the module 120.

As with the module 20 described above, the module 120 can provide a cellular base station that is aesthetically pleasing and that blends well with the pole on which it is mounted. Also, the blind-mating of the radio and antenna can prevent any signal loss that otherwise might occur due to excessive cable lengths between the radio and antenna. Further, the use of multiple radio sectors 122*a*, 122*b*, 122*c* can enable the same antenna 124 to serve three different radios, which is a common arrangement for a small cell base station. As another potential advantage, the use of multiple radio sectors may facilitate blind-mating with the antenna 124, as each radio sector 122*a-c* need only blind-mate with the antenna ports to which it is directly connected, thereby reducing the possibility of poor connection or even misalignment of the ports due to dimensional differences/tolerances in manufacturing. As a further advantage, one radio sector 122*a* may be disconnected and replaced without having to disconnect the other radio sectors 122*b-c*, which may also enable replacement of the radio sector 122*a* without having to also remove the antenna 124.

The modules 20, 120 may take other forms. For example, either of the modules 20, 120 may employ either a canister antenna like the antenna 24 or an annular antenna like the antenna 124, depending on the construction and function of other components of the small cell base station. For example, a canister antenna 24 may be employed if the antenna is to be the topmost component of the structure, but an annular antenna 124 if other components (e.g., a luminaire arm, another antenna module, etc.) is to be deployed above the antenna.

As another example, the three radio sectors 122*a-c* may be replaced with more or fewer radio sectors (e.g., two or four), depending on the desired arrangement. As a further example, the cylindrical radio 22 may be replaced with an annular radio, which, if combined with an annular antenna like the antenna 124, could allow for additional components to be mounted above the antenna, as cables could be passed through the pole 30.

In some embodiments, the diameter of the overall module 20, 120 may be chosen to match (or at least closely resemble) the diameter of the monopole on which it is mounted. Exemplary nominal diameters include 12 and 14.6 inches.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An antenna-radio module for a cellular base station, comprising:
- an antenna having a cylindrical outer surface and a lower surface, wherein at least one antenna communications port is present in the lower surface;
- an annular radio having an outer surface and an upper surface, wherein at least one radio communications port is present on the upper surface;
- wherein the at least one radio communications port and the at least one antenna communications port are mated in a blind-mate configuration; and
- an elongate member, the radio and the antenna being mounted to the elongate member.

2. The module defined in claim 1, wherein cooling fins extend radially outwardly from the outer surface of the radio.

3. The module defined in claim 1, further comprising a shroud that encircles the antenna and the radio.

4. The module defined in claim 3, wherein the shroud includes vent holes.

5. The module defined in claim 3, further comprising a fan unit.

6. The module defined in claim 5, wherein the fan unit is mounted above the antenna.

7. The module defined in claim 1, wherein the antenna is a canister antenna.

8. The module defined in claim 1, wherein the elongate member is mounted on a monopole.

9. The module defined in claim 8, wherein the module is the uppermost component mounted on the monopole.

10. An antenna-radio module for a cellular base station, comprising:
- an antenna having a cylindrical outer surface and a lower surface, wherein a plurality of antenna communications ports are present in the lower surface;
- a plurality of radio sectors, each of the radio sectors having an outer surface and an upper surface, wherein at least one radio communications port is present on the upper surface;
- wherein the plurality of radio sectors are arranged to form an annulus;
- wherein each of the radio communications ports is mated in a blind-mate configuration to a respective one of the antenna communications ports; and
- an elongate member inserted through the annulus, the radio sectors and the antenna being mounted to the elongate member.

11. The module defined in claim 10, wherein cooling fins extend radially outwardly from the outer surfaces of the radio sectors.

12. The module defined in claim 10, further comprising a shroud that encircles the antenna and the radio sectors.

13. The module defined in claim 12, wherein the shroud includes vent holes.

14. The module defined in claim 12, further comprising a fan unit.

15. The module defined in claim 14, wherein the fan unit is mounted above the antenna.

16. The module defined in claim 10, wherein the antenna is an annular antenna.

17. The module defined in claim 16, wherein the elongate member extends through an orifice in the annular antenna.

18. The module defined in claim 10, wherein each of the radio sectors functions as a separate radio.

19. The module defined in claim 10, wherein the elongate member is mounted on a monopole.

20. The module defined in claim 19, wherein a luminaire is mounted above the module.

* * * * *